Jan. 29, 1952   D. B. FURLONG   2,583,940
ICE BOX COOKY CUTTER AND METHOD
Filed Aug. 11, 1950
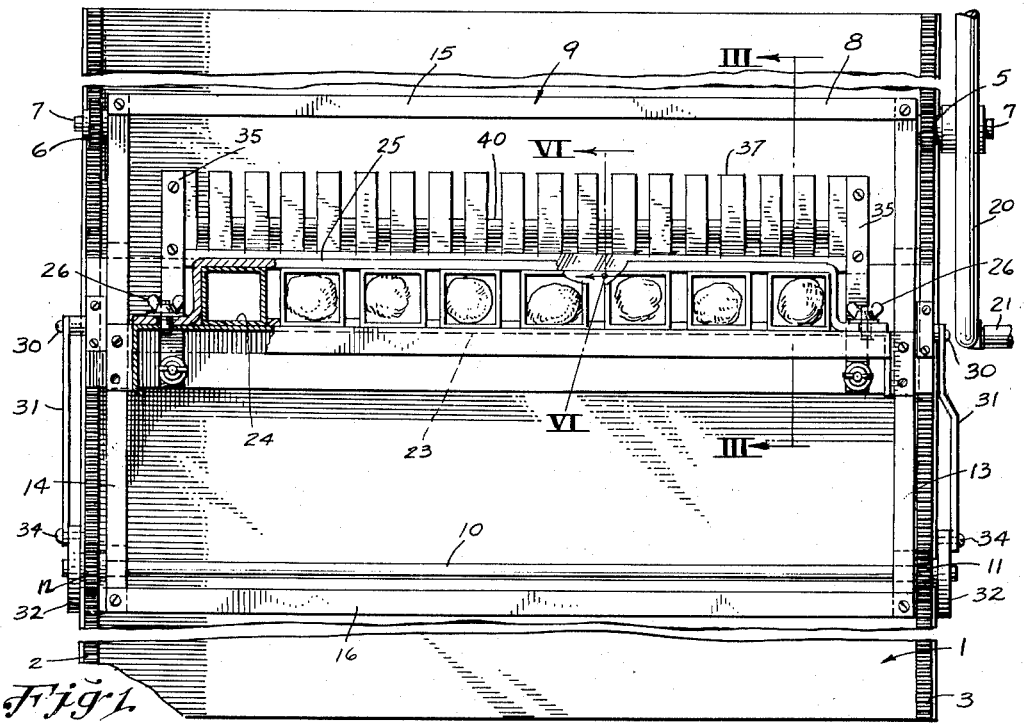
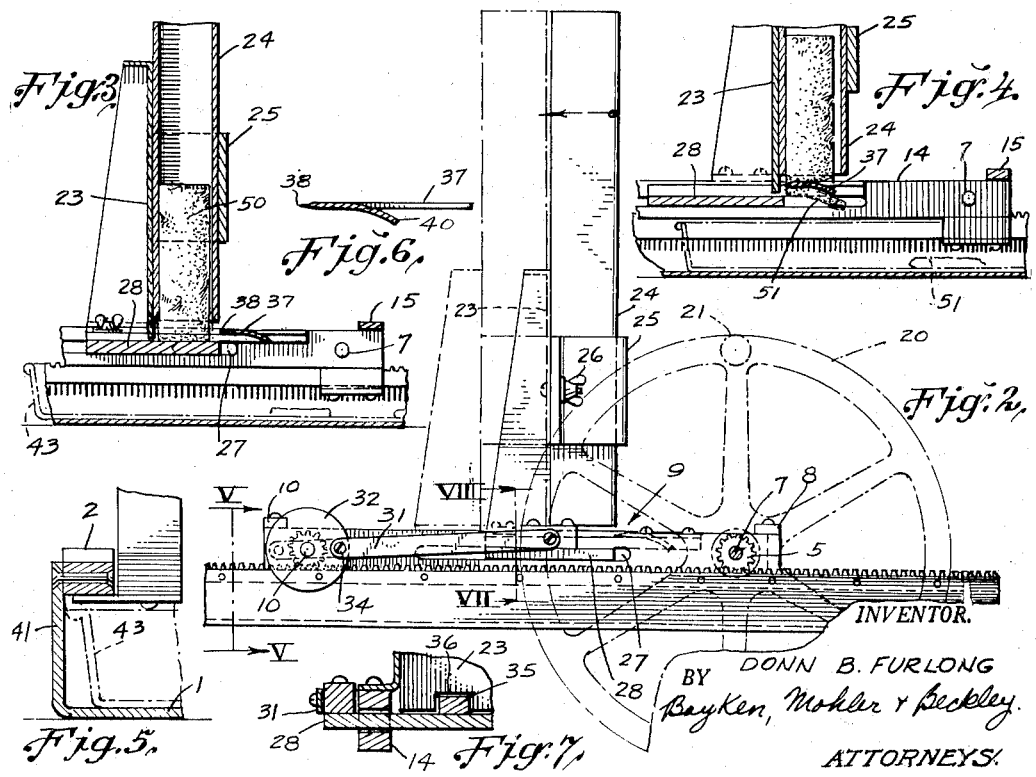
INVENTOR.
DONN B. FURLONG
BY Bayken, Mohler & Beckley
ATTORNEYS.

Patented Jan. 29, 1952

2,583,940

UNITED STATES PATENT OFFICE 2,583,940

ICEBOX COOKY CUTTER AND METHOD

Donn B. Furlong, Oakland, Calif., assignor of one-third to Ernest Weil, San Francisco, Calif., and one-third to Joseph J. Bruno, San Bruno, Calif.

Application August 11, 1950, Serial No. 178,782

8 Claims. (Cl. 107—54)

This invention relates to an ice box cookie cutter and to a method of cutting ice box cookies and distributing them on a supporting surface.

One of the objects of this invention is the provision of a simple, economically made and easily operated ice box cookie cutter that is adapted to be operated in a relatively small space for quickly cutting cookies from ice box dough sufficient to properly fill a conventional, commercial size oven tray and to properly distribute the cookies on said tray.

Ice box dough from which ice box cookies are made is relatively hard, and if formed into a column of any desirable cross sectional contour, it is easily handled and will not stick to the hands or to equipment.

An object of this invention is the method of forming cookies from columns of ice box dough and automatically distributing said cookies in the proper manner on a supporting surface, which may be, and preferably is, a commercial sized tray for a conventional baking oven.

Other objects and advantages will appear in the description and in the drawing.

In the drawing,

Fig. 1 is a top plan view of the means for forming the cookies.

Fig. 2 is a side elevational view of the device of Fig. 1 with the large hand wheel at the near side being in dot-dash lines so as not to obscure structural details behind the wheel.

Fig. 3 is a fragmentary sectional view taken along line III—III of Fig. 1 before a cutting movement.

Fig. 4 is a fragmentary sectional view similar to that of Fig. 3 but showing the cutter at the end of a cutting stroke.

Fig. 5 is an enlarged fragmentary sectional view through a side of the main frame as seen from line V—V of Fig. 2.

Fig. 6 is an enlarged sectional view taken through the cutting blade only along line VI—VI of Fig. 1.

Fig. 7 is an enlarged fragmentary sectional view taken along line VII—VII of Fig. 2.

In detail, the cookie cutting apparatus herein shown comprises a main table, generally designated 1, which table is elongated and is provided with a pair of racks 2, 3 along each of its longitudinally extending edges. These racks are parallel, and their teeth are directed upwardly so as to form tracks for a pair of coaxial gears 5, 6 that are secured on coaxial stub shafts 7, and which shafts, in turn, are secured to one end of the frame 8 of a carriage generally designated 9.

At the other end of frame 8 is a shaft 10 that is parallel with shafts 7 and which shaft 10 carries gears 11, 12 at its ends. The teeth of gears 11, 12 are also in mesh with the teeth of racks 2, 3. Shaft 10 is journalled for rotation in bearings on frame 8.

Frame 8 comprises side frame members 13, 14 and end members 15, 16, the end member 15 being adjacent shafts 7, and end member 16 being adjacent shaft 10.

Secured to gear 5 that is on the shaft 7 adjacent side frame member 13 (Fig. 1) is a large diameter hand wheel 20 that has a handle 21 projecting from a side thereof for grasping by the hand of an operator. This wheel is relatively heavy, thus functioning generally in the manner of a fly wheel or similar inertia member for stabilizing movement of the frame or carriage 9 on racks 2, 3 when the wheel is revolved by hand. Gear 5 being secured to wheel 20, it is obvious that the carriage 9 will be moved along the racks in one direction or the other when the hand wheel is revolved.

Secured to the side frame members 13, 14 at a point intermediate the end members 15, 16 is a vertical plate 23, and secured to the side of vertical plate 23 that faces end frame member 15 is a horizontal row of vertical, horizontally spaced, open-ended tubes 24. These tubes may be removably clamped against plate 23 by a horizontal strip 25, the ends of which project beyond the ends of the row of tubes and are secured to plate 23 by wing nuts 26. Upon loosening wing nuts 26, the tubes may be moved closer together or farther apart, or either up or down, and then by tightening the nuts they will be held rigidly in adjusted position.

While tubes 24 are shown in Fig. 1 as being rectangular in cross-sectional contour, they may be circular or of any other desired shape.

In whatever adjusted position the tubes 24 will be in, the lower edge of plate 23 should project below the lower ends of said tubes.

Below the lower edge of the vertical plate 23, and extending at its ends through horizontal slots 27 formed in side frame members 13, 14 is a cross-head plate 28. This cross head plate is horizontally slidable transversely of its length in said slots, and the outer ends of said cross head plate are pivotally secured by pivots 30 to one of the ends of a pair of connecting rods 31. The opposite ends of said connecting rods 31 are respectively pivotally secured to crank elements 32 that are secured to the ends of shaft 10 for rotation with the latter. These crank elements may take the form of crank discs with the pivots or crank pins 34 for rods 31 secured thereto eccentrically thereof.

The cross head plate 28 has a pair of parallel arms 35 secured at one of their ends thereto, and which arms are respectively adjacent the ends of said cross head plate and at right angles thereto and extend past the vertical plate 23 and the tubes 24. The lower edge of plate 23 is notched, or recessed at 36 (Fig. 7) for passage of said arms. Said arms 35 support cutting means that comprises an elongated horizontal, horizontally elongated blade 37 extending between said arms, the ends of said blade being secured to the latter. Blade 37 is offset to the side of the cross head plate 28 toward the end frame member 15, and is formed with a cutting edge 38 along the edge adjacent plate 28. This edge is substantially in a vertical plane in which the adjacent edge of said cross head plate is disposed. Hence, looking down from above plate 28 and blade 37, there is preferably no gap between the adjacent edges of the plate and blade, although blade 37 is at a level above that of plate 28.

From the above, it will be seen that plate 28 and blade 37 are reciprocable in a direction transversely of their lengths when the carriage is rolled along racks 2, 3. This is due to the fact that plate 28 is connected by connecting rods 31 with cranks 32, and the latter are connected by shaft 10 with gears 11, 12.

At one end of its stroke, the plate 28 extends across the lower open ends of the tubes 24, but spaced from said ends. At the opposite end of the stroke the blade 37 is below the lower open ends of said tubes, and fairly close to the latter. The cutting edge 38 of the blade 37 will be closely adjacent the lower marginal portion of the vertical plate 23 when the stroke is finished, having passed completely across the lower open ends of the tube. The width of blade 37 is preferably such as to extend substantially across the lower open ends of the tubes when the blade is at the end of the stroke that places it below said tubes.

The blade 37 is provided with a plurality of downwardly slanting fingers 40 which may be struck from the blade (Figs. 1 and 6).

The table 1 preferably has upstanding marginal portions 41 (Fig. 5) to which racks 2, 3 are secured, and the portion of the table extending between the lower edges of said marginal portions is spaced below the cross head plate 28 a sufficient distance to enable a conventional cookie tray 43, indicated in dot-dash lines in Fig. 5 to be positioned on said table. When the tray is in this position, the sides of the tray extend past the downwardly projected areas of the end tubes 25 of the row thereof. The table 1 may be quite long, with any desired number of trays thereon, although very fast loading of trays can be accomplished where the trays are handled one at a time. Where space is at a premium, the installation may have a table adapted to hold only a single tray, in which case the length of the table would be only slightly longer than such tray. At any time, sections could be added to the table carrying racks thereon, since the table itself functions merely as a support for the carriage and trays, and has no moving parts.

For the purpose of illustration, let it be assumed that a tray is on table 1 and the carriage 9 is at one end of the tray with the cross head plate 28 in the position shown in Fig. 3. Each of the tubes 24 has a column 50 of ice box dough thereon supported on plate 28 as seen in Fig. 3. Immediately upon moving the carriage 9 over the tray the plate 28 will commence to slip from under the columns 50 and at the same time blade 37 will commence to cut a slice 51 (Fig. 4) off the lower end of each column and the blade will then support the columns 50 when the latter is in the position shown in Fig. 4.

The slices 51 will then drop by gravity onto the tray 43 and by the time the carriage has moved a sufficient distance forwardly so that the lower open ends of the tubes will have cleared the previously deposited slices another row of slices will be cut from the lower ends of the columns of dough. The carriage is moved forwardly until the tray is fully loaded, after which the tray may be removed, another positioned, and reverse movement of the carriage over this second tray will fill it with slices or cookies. While the carriage may be moved back to an initial starting position after each tray is filled, this is not necessary for the apparatus will work as well going in one direction as in the other.

The curved marginal portion of the blade properly directs the slice downwardly and onto the tray when the blade has finished its cut. The lower marginal portion of the vertical plate 23 insures against any tendency of the slice to slide forwardly during the cutting step.

I claim:

1. The method of cutting and distributing ice box cookies on a supporting surface that comprises the steps of; supporting vertically extending columns of ice box dough in a horizontally extending row spaced above a surface on which the cookies are to be distributed, moving said row over said surface in a direction transversely of said row, simultaneously cutting slices of uniform thickness off the lower ends of said columns at uniform intervals for dropping of said slices by gravity on said surface in rows respectively corresponding in arrangement to said row of columns.

2. Ice box cookie cutting apparatus comprising; a carriage supported for horizontal movement in one direction, supporting means on said carriage adapted to support a horizontal row of substantially vertical columns of ice box dough thereon, cutting means adjacent the lower ends of the columns of said row supported for movement transversely across the lower ends of said columns for cutting a slice of dough off the bottom of each column, means for moving said supporting means from below said columns during movement of said cutting means across said lower ends whereby the said slices will be free to fall by gravity upon being cut from said columns, means supporting said carriage for said horizontal movement including a wheel rotatable during said movement, and a mechanism connecting said wheel with said cutting means and with said supporting means for simultaneously moving said supporting means from below said columns and said cutting means across the lower ends of said columns upon rotation of said wheel and movement of said carriage.

3. Ice box cookie cutting apparatus comprising; a carriage supported for horizontal movement in one direction, a support on said carriage for supporting a vertical column of ice box dough thereon, holding means on said carriage for holding said column against lateral movement relative to said carriage, a cutter adjacent said support, means supporting said cutter on said carriage for movement across the lower end of a column held by said holding means for cutting a slice off the lower end of said column, means supporting said carriage for said movement including a wheel, a mechanism connecting said wheel with said blade for so moving said blade across the lower end of said column upon movement of said carriage in said direction.

4. Ice box cookie cutting apparatus comprising; a carriage supported for horizontal movement in one direction, a support on said carriage for supporting a vertical column of ice box dough thereon, holding means on said carriage for holding said column against lateral movement relative to said carriage, a cutter adjacent said support, means supporting said cutter on said carriage for movement across the lower end of a column held by said holding means for cutting a slice off the lower end of said column, means supporting said carriage for said movement including a wheel, a mechanism connecting said wheel with said blade for so moving said blade across the lower end of said column upon movement of said carriage in said direction, means connecting said cutter with said support for movement therewith in direction away from below said column upon movement of said cutter across said lower end of said column.

5. Ice box cookie cutting apparatus comprising; a carriage supported for horizontal movement in one direction, a support on said carriage for supporting a vertical column of ice box dough thereon, holding means on said carriage for holding said column against lateral movement relative to said carriage, a cutter adjacent said support, means supporting said cutter on said carriage for movement across the lower end of a column held by said holding means for cutting a slice off the lower end of said column, means supporting said carriage for said movement including a wheel, a mechanism connecting said wheel with said blade for so moving said blade across the lower end of said column upon movement of said carriage in said direction, means connecting said cutter with said support for movement therewith in a direction away from below said column upon movement of said cutter across said lower end of said column, said wheel being a gear wheel, a stationary rack extending longitudinally of the direction of movement of said carriage having its teeth in engagement with the teeth of said wheel, and the said mechanism including a crank connected with said wheel, a connecting rod connecting said crank with said cutter and support.

6. Ice box cookie cutting apparatus comprising; a carriage supported for horizontal movement in one direction, a support on said carriage for supporting a vertical column of ice box dough thereon, holding means on said carriage for holding said column against lateral movement relative to said carriage, a cutter adjacent said support, means supporting said cutter on said carriage for movement across the lower end of a column held by said holding means for cutting a slice off the lower end of said column, means supporting said carriage for said movement including a wheel, a mechanism connecting said wheel with said blade for so moving said blade across the lower end of said column upon movement of said carriage in said direction, said cutter being a horizontal blade disposed at a level below that of said support and offset to one side of said support and provided with a cutting edge along the edge adjacent said support, the marginal portion of said blade along the edge opposite said cutting edge being curved downwardly for forcing the slice cut from the lower end of said column downwardly when said blade is moved across the said lower end, and means connecting said support with said blade for movement away from below said column when said blade is moved across said lower end of said column.

7. Ice box cookie cutting apparatus comprising; a carriage supported for horizontal movement in one direction, a support on said carriage for supporting a vertical column of ice box dough thereon, holding means on said carriage for holding said column against lateral movement relative to said carriage, a cutter adjacent said support, means supporting said cutter on said carriage for movement across the lower end of a column held by said holding means for cutting a slice off the lower end of said column, means supporting said carriage for said movement including a wheel, a mechanism connecting said wheel with said blade for so moving said blade across the lower end of said column upon movement of said carriage in said direction, said cutter being a horizontal blade disposed at a level below that of said support and offset to one side of said support and provided with a cutting edge along the edge adjacent said support, the marginal portion of said blade along the edge opposite said cutting edge being curved downwardly for forcing the slice cut from the lower end of said column downwardly when said blade is moved across the said lower end, and means connecting said support with said blade for movement away from below said column when said blade is moved across said lower end of said column, means for moving said carriage in said direction.

8. Ice box cookie cutting apparatus comprising; a carriage supported for horizontal movement in one direction, a support on said carriage for supporting a vertical column of ice box dough thereon, holding means on said carriage for holding said column against lateral movement relative to said carriage, a cutter adjacent said support, means supporting said cutter on said carriage for movement across the lower end of a column held by said holding means for cutting a slice off the lower end of said column, means supporting said carriage for said movement including a wheel, a mechanism connecting said wheel with said blade for so moving said blade across the lower end of said column upon movement of said carriage in said direction, means connecting said cutter with said support for movement therewith in a direction away from below said column upon movement of said cutter across said lower end of said column, said holding means comprising a vertical open ended tube.

DONN B. FURLONG.

REFERENCES CITED

The following references are of record in the file of this patent:

UNITED STATES PATENTS

| Number | Name | Date |
|---|---|---|
| 782,614 | Manning | Feb. 14, 1905 |
| 1,334,304 | Hodgdon et al. | Mar. 23, 1920 |
| 2,482,146 | Baker | Sept. 20, 1949 |